(12) United States Patent
Takaki et al.

(10) Patent No.: US 8,082,561 B2
(45) Date of Patent: Dec. 20, 2011

(54) MOTOR PROVIDED WITH CHUCKING DEVICE AND DISK DRIVING DEVICE EQUIPPED WITH THE MOTOR

(75) Inventors: Hitoshi Takaki, Kyoto (JP); Shigeo Hayashi, Kyoto (JP); Yusuke Iwai, Kyoto (JP); Nobuaki Yasumoto, Kyoto (JP); Yosuke Kawano, Kyoto (JP)

(73) Assignee: Nidec Corporation, Kyoto (JP)

( * ) Notice: Subject to any disclaimer, the term of this patent is extended or adjusted under 35 U.S.C. 154(b) by 602 days.

(21) Appl. No.: 12/252,483

(22) Filed: Oct. 16, 2008

(65) Prior Publication Data

US 2009/0096303 A1    Apr. 16, 2009

(30) Foreign Application Priority Data

Oct. 16, 2007  (JP) .................................. 2007-269262

(51) Int. Cl.
*G11B 17/00* (2006.01)
(52) U.S. Cl. ........................................ 720/710; 720/712
(58) Field of Classification Search .................. 720/710, 720/712
See application file for complete search history.

(56) References Cited

U.S. PATENT DOCUMENTS

| | | |
|---|---|---|
| 6,445,674 B1 | 9/2002 | Morita |
| 2004/0114497 A1 | 6/2004 | Lee et al. |
| 2007/0133123 A1 * | 6/2007 | Ichizaki ..................... 360/99.05 |
| 2007/0278880 A1 | 12/2007 | Wada et al. |

FOREIGN PATENT DOCUMENTS

| | | |
|---|---|---|
| JP | 05-023782 U | 3/1993 |
| JP | 2005-253239 A | 9/2005 |
| KR | 10-0396396 B1 | 9/2003 |
| KR | 10-2003-0094639 A | 12/2003 |
| KR | 10-0474139 B1 | 3/2005 |
| KR | 10-0576863 B1 | 5/2006 |
| KR | 10-0637880 B1 | 10/2006 |

* cited by examiner

*Primary Examiner* — Michael Tran
(74) *Attorney, Agent, or Firm* — Keating & Bennett, LLP

(57) ABSTRACT

A motor includes a rotating body including a magnet, and a fixed body including a stator. The stator includes a stator core having an annular core back portion with an upper and a lower surface, and a plurality of circumferentially spaced-apart tooth portions extending from the core back portion in a direction away from the rotational axis, and a plurality of coils provided by winding a conductive wire around the tooth portions of the stator core with multiple turns. The rotor holder is arranged axially above the stator to cover the stator. Further, an annular or arc-shaped attracting magnet arranged to attract the rotor holder toward the stator is arranged radially inwardly of the core back portion, the attracting magnet having an upper surface axially facing toward the rotor holder, and a lower surface arranged axially below the upper surface of the core back portion of the stator core.

17 Claims, 6 Drawing Sheets

MOTOR PROVIDED WITH CHUCKING DEVICE AND DISK DRIVING DEVICE EQUIPPED WITH THE MOTOR

BACKGROUND OF THE INVENTION

1. Field of the Invention

The present invention relates to a motor provided with a chucking device, and, more particularly, to an arrangement and structure of an attracting magnet for suppressing vibrations of a rotating body of the motor. Further, the present invention also relates to a disk driving device equipped with the motor.

2. Description of the Related Art

In recent years, as a disk driving device for optically recording and reproducing an optical disk (hereinafter simply referred to as a "disk"), such as a DVD, a CD, or the like, becomes thinner, there are increasing demands for a low-profile motor mounted to the disk driving device for rotating the disk. This kind of motor includes a chucking device for removably holding the disk, the chucking device having a mounting portion to which the disk is mounted.

Recently, the recording pitch of the disk has grown to be narrower as the storage capacity thereof increases. For that reason, the light used in recording and reproducing the disk needs to be irradiated with increased accuracy. Moreover, the motor needs to be rotated at a high speed as the requirements of recording and reproducing the disk become faster.

It becomes difficult to reduce surface vibration of the disk because the low-profile design of the motor results in a decrease in the length of a bearing part that rotatably supports the rotating body of the motor. When the disk is rapidly rotated by the motor, a problem is posed in that the disk may be off-centered due to an unbalance with respect to the rotational center thereof. This problem becomes apparent if the disk is rotated at a high speed.

As a solution to the problem noted above, there has been proposed a structure in which an attracting magnet for magnetically attracting a rotating body of a motor is arranged to oppose the rotating body, thereby suppressing floating and vibration of the rotating body.

However, the space required for installing the attracting magnet within the motor gets smaller when the motor is designed to provide a low-profile shape. In addition, if the attracting magnet is arranged in contact with a stator that forms a magnetic circuit for generating a motor driving force, the magnetic circuit may be influenced by the stator, which may negatively affect the motor efficiency.

SUMMARY OF THE INVENTION

In view of the above problems, the preferred embodiments of the present invention provide a structure for use in a low-profile motor, in which an attracting magnet arranged to magnetically attract a rotating body of the motor is provided in an effective manner.

In accordance with a preferred embodiment of the present invention, a motor includes a rotating body including a rotor magnet rotatable about a rotational axis and a rotor holder that holds the rotor magnet, the rotor magnet including a magnetic body, and a fixed body including a stator arranged to oppose the rotor magnet. Herein, the stator includes a stator core having an annular core back portion, and a plurality of circumferentially spaced-apart tooth portions extending from the core back portion in a direction away from the rotational axis, and a plurality of coils formed by winding a conductive wire around the tooth portions of the stator core so that the wire includes multiple turns. Further, the rotor holder is arranged axially above the stator to cover the stator. Furthermore, an annular, or arc-shaped attracting magnet arranged to attract the rotor holder toward the stator is arranged radially inwardly of the core back portion, the attracting magnet having an upper surface axially facing toward the rotor holder, and a lower surface arranged axially below the upper surface of the core back portion of the stator core.

With this configuration, the attracting magnet is arranged radially inwardly of the core back portion and the lower surface of the attracting magnet, and is arranged axially below the upper surface of the core back portion of the stator core. This makes it possible to arrange the attracting magnet in a position other than the limited axial space between the rotor holder and the stator. As a consequence, it becomes possible to minimize the axial distance between the rotor holder and the stator, which helps to realize a low-profile motor.

Particularly, since the lower surface of the attracting magnet is arranged axially below the upper surface of the core back portion, it is possible to alleviate the restriction imposed on the axial thickness of the attracting magnet. This makes it possible to set the volume of the attracting magnet with a considerable degree of freedom. As a result, by changing the axial thickness of the attracting magnet in conformity with the specifications required in a particular motor, it is possible to provide plural kinds of motors that remain substantially identical in their structures other than the axial thickness of the attracting magnet.

It is preferable that the attracting magnet is magnetized with two poles along a circumferential direction thereof.

With this configuration, it is possible to simultaneously magnetize a plurality of attracting magnets, because the attracting magnet is magnetized with two poles along the circumferential direction thereof. This makes it possible to increase the motor production efficiency.

Further, since the attracting magnet is arranged radially inwardly of the core back portion of the stator core, it is possible to prevent the magnetic flux of the attracting magnet from affecting the stator core. In the event that the attracting magnet is attached to the upper surface of the core back portion of the stator core, the magnetic flux flowing through the stator core is increased if the attracting magnet is magnetized with only two poles. For this reason, there is a possibility that the magnetic flux may affect the magnetic circuit formed between the tooth portions and the rotor magnet. However, since the attracting magnet according to a preferred embodiment of the present invention is arranged radially inwardly of the core back portion, it is possible to prevent the magnetic flux from affecting the magnetic circuit formed between the tooth portions and the rotor magnet.

It is preferable that a magnetic yoke is arranged on the lower surface of the attracting magnet.

With this configuration, the magnetic flux leaked from the attracting magnet is absorbed by the yoke because the yoke is arranged on the lower surface of the attracting magnet. Therefore, it is possible to increase the force at which the rotor holder is attracted by the attracting magnet.

It is preferable that the yoke is formed into an annular or arc shape, and has a radial width smaller than that of the attracting magnet.

With this configuration, it is possible to increase the stiffness of the housing because the volume of the housing can be increased in proportion to the reduction in the radial width of the yoke. This makes it possible to reduce noise resulting from the vibration of the housing itself.

It is preferable that the yoke has an annular or arc shape, and the attracting magnet has an outer circumferential surface substantially flush with an outer circumferential surface of the yoke in an axial direction.

With this configuration, it is possible to prevent leakage of the magnetic flux of the attracting magnet to the stator core, because the outer circumferential surface of the attracting magnet is substantially flush with the outer circumferential surface of the yoke in an axial direction.

It is preferable that the fixed body includes a substantially cylindrical bearing mechanism arranged to rotatably support the rotating body, and a housing having a cylindrical holding portion arranged to hold the bearing mechanism, wherein the housing has an annular extension portion extending radially outwardly from the cylindrical holding portion, wherein the extension portion includes a mounting portion to which the lower surface of the core back portion of the stator core is mounted, and a peripheral wall portion to which the core back portion is fixed at its inner circumferential surface, and wherein a hollow portion in which the attracting magnet is accommodated is formed radially inwardly of the peripheral wall portion, the hollow portion having a lower surface formed axially below an upper surface of the peripheral wall portion.

With this configuration, it is possible for the housing to provide a space required in arranging the lower surface of the attracting magnet axially below the upper surface of the core back portion, while firmly holding the stator core in place. This is because the lower surface of the hollow portion is formed axially below the upper surface of the peripheral wall portion.

It is preferable that the fixed body includes a substantially cylindrical bearing mechanism arranged to rotatably support the rotating body, and a housing having a cylindrical holding portion arranged to hold the bearing mechanism, wherein the housing has an annular extension portion extending radially outwardly from the cylindrical holding portion, wherein the extension portion includes a mounting portion to which the lower surface of the core back portion of the stator core is mounted, and a peripheral wall portion to which the core back portion is fixed at its inner circumferential surface, wherein a first hollow portion in which the attracting magnet is placed and a second hollow portion in which the yoke is placed are arranged radially inwardly of the peripheral wall portion, and wherein the second hollow portion has a lower surface arranged axially below the first hollow portion, the first hollow portion has a lower surface arranged axially below an upper surface of the peripheral wall portion, and the first hollow portion joins to the second hollow portion.

With this configuration, it is possible for the housing to provide a space required in arranging the lower surface of the attracting magnet axially below the upper surface of the core back portion, while firmly holding the stator core in place. This is because the lower surface of the first hollow portion is arranged axially below the upper surface of the peripheral wall portion. Furthermore, since the space required in arranging the yoke is secured by the second hollow portion, it is possible to realize a low-profile motor even when the yoke is arranged in place.

Particularly, the second hollow portion can be arranged more radially outward if the outer circumferential surface of the attracting magnet is substantially flush with the outer circumferential surface of the yoke in an axial direction. This makes it possible to increase the radial width of the extension portion of the housing that supports the bearing mechanism.

Therefore, it is possible to increase the stiffness of the housing required in supporting the entirety of the rotating body with a bearing.

It is preferable that an adhesive agent is applied at least on the lower surface of the second hollow portion.

With this configuration, an adhesive agent is filled between the lower surface, inner circumferential surface, and outer circumferential surface of the yoke and the second hollow portion as the adhesive agent is applied on the lower surface of the second hollow portion. This makes it possible to firmly fix the yoke to the housing.

It is preferable that gaps are formed between the inner circumferential surface, outer circumferential surface and lower surface of the attracting magnet and the first hollow portion.

With this configuration, it is possible to arrange the attracting magnet regardless of the machining accuracy of the first hollow portion, because gaps are formed between the attracting magnet and the first hollow portion. This makes it possible to accurately arrange the upper surface of the attracting magnet with respect to the lower surface of the rotor holder.

It is preferable that the rotor holder includes a central recess portion depressed in an axially upward direction and arranged to receive a portion of the cylindrical holding portion of the housing, and a planar portion extending radially outwardly from the central recess portion, wherein a radially outwardly extending protrusion is arranged on an upper extension of the cylindrical holding portion, a removal preventing member having a plurality of removal preventing portions circumferentially spaced apart and protruding radially inwardly from an inner edge of the planar portion is attached to a radially inner region of the planar portion, each of the removal preventing portions has an upper surface that, when the rotating body is lifted in an axially upward direction, makes contact with a lower surface of the protrusion to prevent further axial upward movement of the rotating body, and the attracting magnet is arranged in an approximately same radial position as that of the removal preventing member.

With this configuration, it is possible to secure a space for arrangement of the removal preventing member because the attracting magnet and the removal preventing member are arranged in the same radial position.

It is preferable that the rotor holder is provided with a disk support portion arranged to support a disk. A chucking device arranged to hold the disk is mounted to the rotor holder radially inwardly of the disk support portion, and the chucking device includes a chuck claw arranged to hold the disk and a resilient member arranged to bias the chuck claw in a radially outward direction.

With this configuration, it is possible to reduce vibrations generated during rotation of the rotor holder because the rotor holder is attracted by the attracting magnet. Thus, it is possible to reduce the surface deflection of the disk supported on the disk support portion of the rotor holder.

In accordance with another preferred embodiment of the present invention, a disk driving device includes the motor configured as above, an optical pickup mechanism arranged to irradiate light on a disk and receive the light reflected from the disk, and a moving mechanism arranged to move the optical pickup mechanism in a radial direction of the disk.

With this configuration, it is possible to provide a disk driving device that enjoys reduced vibration while employing a low-profile motor.

In accordance with various preferred embodiments of the present invention, it is possible to provide a structure for use in a low-profile motor, in which an attracting magnet for magnetically attracting a rotating body of the motor is arranged in an effective manner.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Overall Structure of Motor

An overall structure of a motor in accordance with a preferred embodiment of the present invention will now be described with reference to FIG. 1, which is an axially-cut schematic section view showing the present motor.

Figure 1:
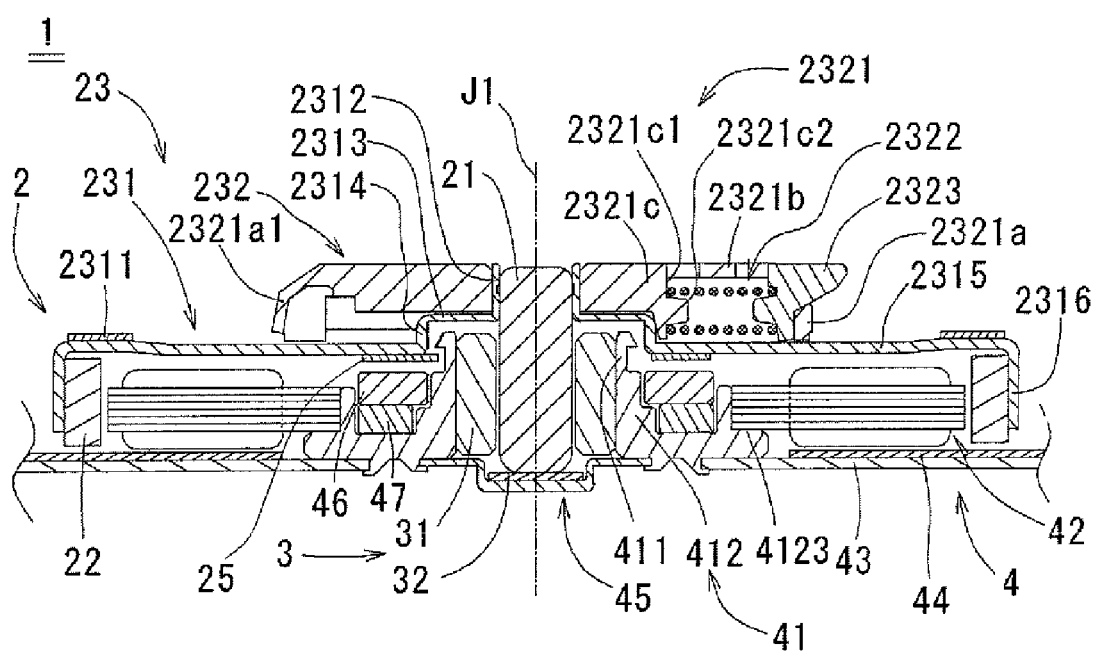
FIG. 1 is an axially-cut schematic section view showing a preferred embodiment of a motor in accordance with the present invention.

Referring to FIG. 1, a motor 1 preferably includes a rotating body 2 having a shaft 21 coaxially arranged with a specified center axis J1, a rotor magnet 22 rotating together with the shaft 21 and a chucking device 23 arranged to removably hold a disk (not shown), a bearing mechanism 3 arranged to rotatably support the shaft 21, and a fixed body 4 having a housing 41 arranged to hold the bearing mechanism 3. In the following description, the direction heading toward the chucking device 23 along the center axis J1 will be referred to as "upper" and the direction heading toward the housing 41 along the center axis J1 will be referred to as "lower", for the sake of convenience. However, it should be noted that the center axis J1 does not necessarily coincide with the gravitational direction.

The rotating body 2 preferably includes a shaft 21, a turntable 231 as a rotor holder fixed to the outer circumferential surface of the upper portion of the shaft 21, a rotor magnet 22 fixed to the turntable 231 and a chuck case 232 fixed to the center portion of the turntable 231. In this regard, the turntable 231 and the chuck case 232 constitute the chucking device 23.

The bearing mechanism 3 preferably includes a substantially cylindrical sleeve 31 arranged to rotatably support the shaft 21 in a radial direction and a substantially disk-like thrust plate 32 arranged to rotatably support the shaft 21 in an axial direction. The sleeve 31 preferably has an axial through-hole into which the shaft 21 is inserted. The sleeve 31 is preferably made of a substantially cylindrical oil-containing sintered material. The thrust plate 32 is preferably arranged below the sleeve 31.

The fixed body 4 preferably includes a housing 41 having an inner circumferential surface arranged to hold the outer circumferential surface of the sleeve 31, a stator 42 fixed to the housing 41, an attachment plate 43 fixed to the outer lower surface of the housing 41, a circuit board 44 fixed to the upper surface of the attachment plate 43 and a center plate 45 fixed to the inner lower surface of the housing 41, the center plate 45 having an upper surface kept in contact with the lower surface of the thrust plate 32. An attracting magnet 46 is preferably attached to the housing 41 radially outwardly of the stator 42. The attracting magnet 46 preferably serves to attract the turntable 231 in an axially downward direction.

Overall Structure of Chucking Device

Figure 2:
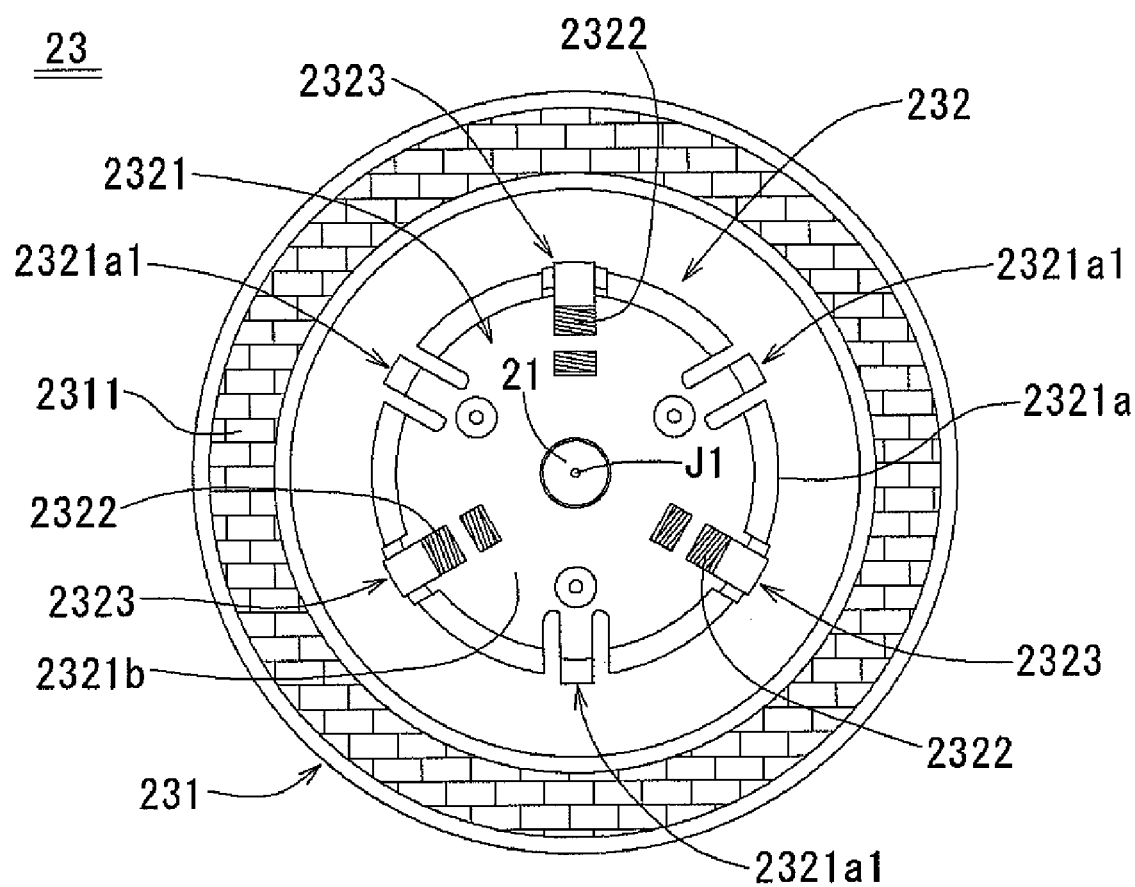
FIG. 2 is a top plan view showing a chucking device in accordance with a preferred embodiment of the present invention.
Figure 3:
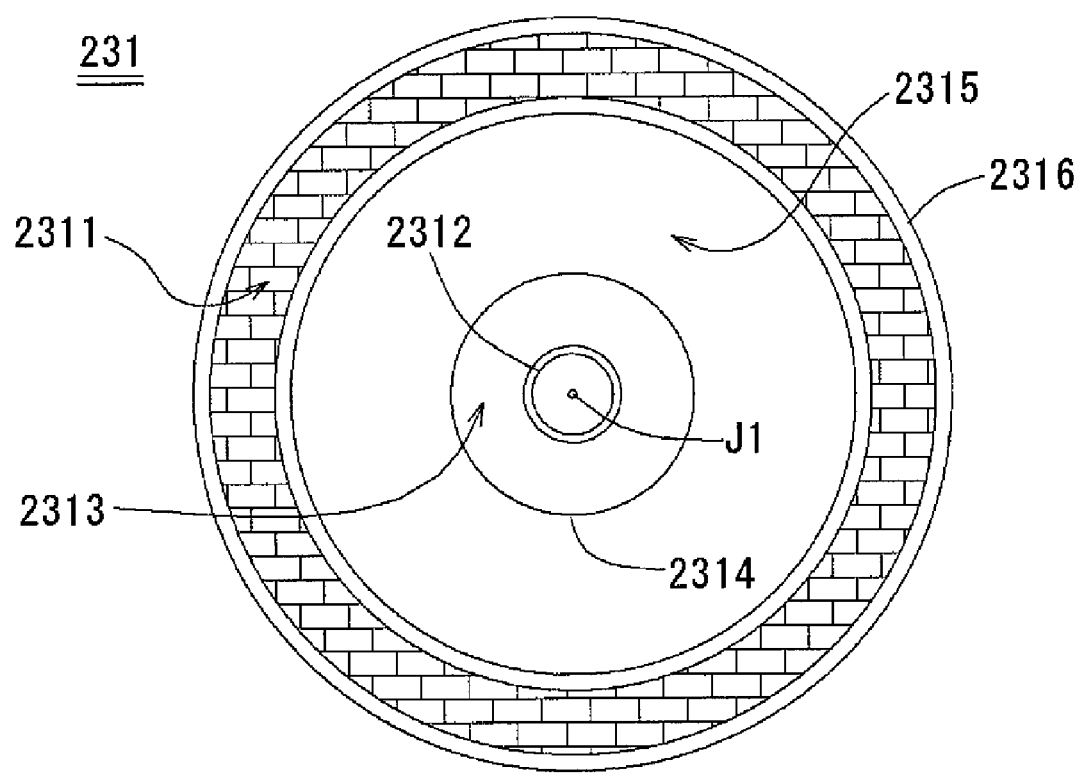
FIG. 3 is a top plan view showing a turntable in accordance with a preferred embodiment of the present invention.
Figure 4A:
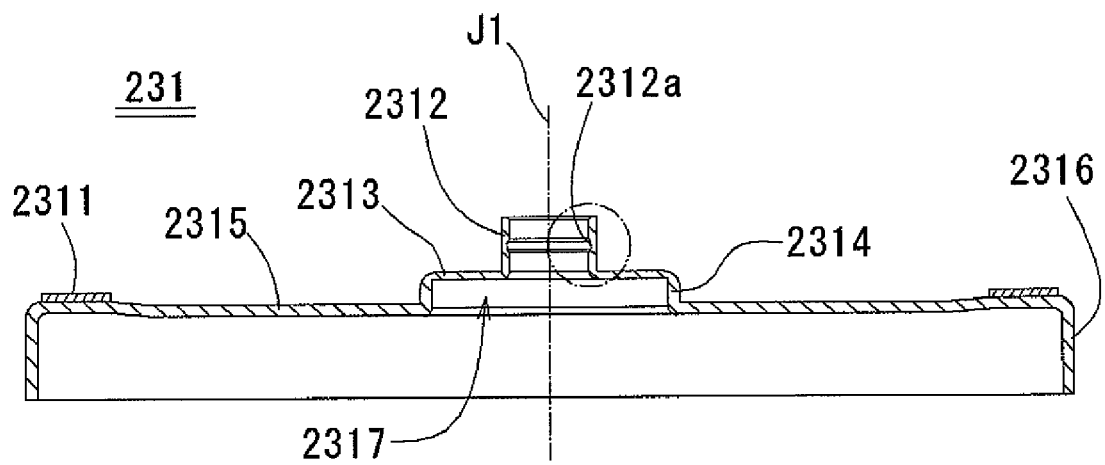
FIGS. 4A and 4B are axially-cut schematic section views of the turntable in accordance with a preferred embodiment of the present invention.
Figure 4B:
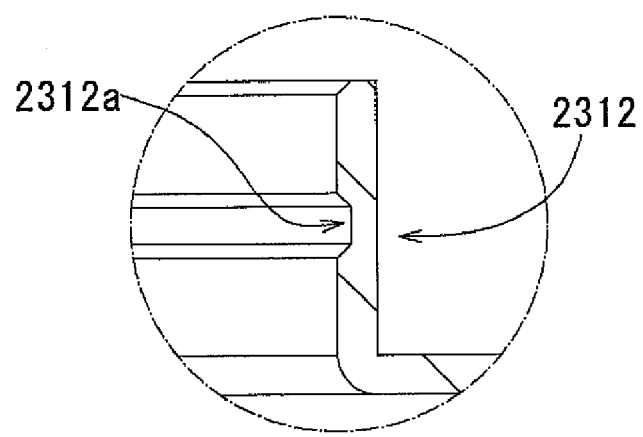

Next, an overall structure of the chucking device 23 in accordance with a preferred embodiment of the present invention will be described with reference to FIGS. 1 through 4B. FIG. 2 is a top plan view of the present chucking device 23. FIG. 3 is a top plan view of the present turntable 231. FIG. 4A is an axially-cut schematic section view of the present turntable 231 and FIG. 4B is an enlarged view of the portion surrounded by a single-dot chain line circle in FIG. 4A.

Referring to FIGS. 1 and 2, the chucking device 23 includes a turntable 231 having a disk support portion 2311 arranged to support a disk and a chuck case 232 arranged radially inwardly of the disk support portion 2311.

The chuck case 232 preferably includes a substantially disk-like casing 2321 formed by, for example, injection-molding a resin material or the like, a plurality of resilient members 2322 (e.g., coil springs) received within the casing 2321 and a plurality of chuck claws 2323 radially outwardly biased by the resilient members 2322. In the present preferred embodiment, the number of each of the resilient members 2322 and the chuck claws 2323 preferably are three, for example, but any desirable number could be used. A plurality of centering claws 2321a1 for making contact with the central opening portion (not shown) of the disk to bring the center of the casing 2321 into alignment with the center of the central opening portion of the disk is integrally formed with the outer circumferential surface of the casing 2321 in a circumferentially spaced-apart relationship with one another. In the present preferred embodiment, the number of the centering claws 2321a1 preferably is three, for example, but any desirable number could be used.

Referring again to FIG. 1, the casing 2321 is preferably provided with an outer cylinder portion 2321a radially opposing the inner circumferential surface of the central opening portion of the disk, a ceiling plate portion 2321b arranged to cover the upper side of the outer cylinder portion 2321a and a base portion 2321c having a through-hole extending axially downwardly from the central portion of the ceiling plate portion 2321b. Planar portions 2321c1 that make contact with the radial inner ends of the resilient members 2322 are preferably formed on the outer radial surface of the base portion 2321c. Protruding portions 2321c2 that extend radially outwardly to engage with the resilient members 2322 are preferably integrally formed in the circumferential center region of the planar portion 2321c1.

Referring to FIGS. 3 and 4, the turntable 231 is preferably formed into a substantially cylindrical shape by, for example, pressing a thin steel plate as a magnetic body. In the present preferred embodiment, the turntable 231 is formed by performing a drawing work during the pressing work. In the present preferred embodiment, the turntable 231 is preferably formed of a galvanized steel plate, so as to provide a magnetic body. The turntable 231 preferably includes a first cylinder portion 2312 having an inner circumferential surface attachable to the outer circumferential surface of the shaft 21, a first planar portion 2313 extending radially outwardly from the lower end of the first cylinder portion 2312, a second cylinder portion 2314 extending axially downwardly from the outer edge of the first planar portion 2313, a second planar portion 2315 extending radially outwardly from the lower end of the second cylinder portion 2314 and a third cylinder portion 2316 extending axially downwardly from the outer edge of the second planar portion 2315.

A central recess portion 2317 is defined by the first planar portion 2313 and the second cylinder portion 2314. A disk support portion 2311 arranged to support the disk is preferably provided in the outer periphery region of the second planar portion 2315. The rotor magnet 22 is preferably fixed to the inner circumferential surface of the third cylinder portion 2316 (see FIG. 1). Since three curved portions are arranged in the central region of the turntable 231 via the first cylinder portion 2312, the first planar portion 2313, the second cylinder portion 2314 and the second planar portion 2315, it is possible to enhance the stiffness of the turntable 231 itself.

On the inner circumferential surface of the first cylinder portion 2312, there is preferably an increased diameter portion 2312a in which the inner diameter of the first cylinder portion 2312 is enlarged. The increased diameter portion 2312a is preferably formed by radially outwardly depressing the inner circumferential surface of the first cylinder portion 2312 into an annular shape. In a pressing work, the increased diameter portion 2312a corresponds to a shock line.

Attracting Magnet and its Neighboring Structure

Figure 5:
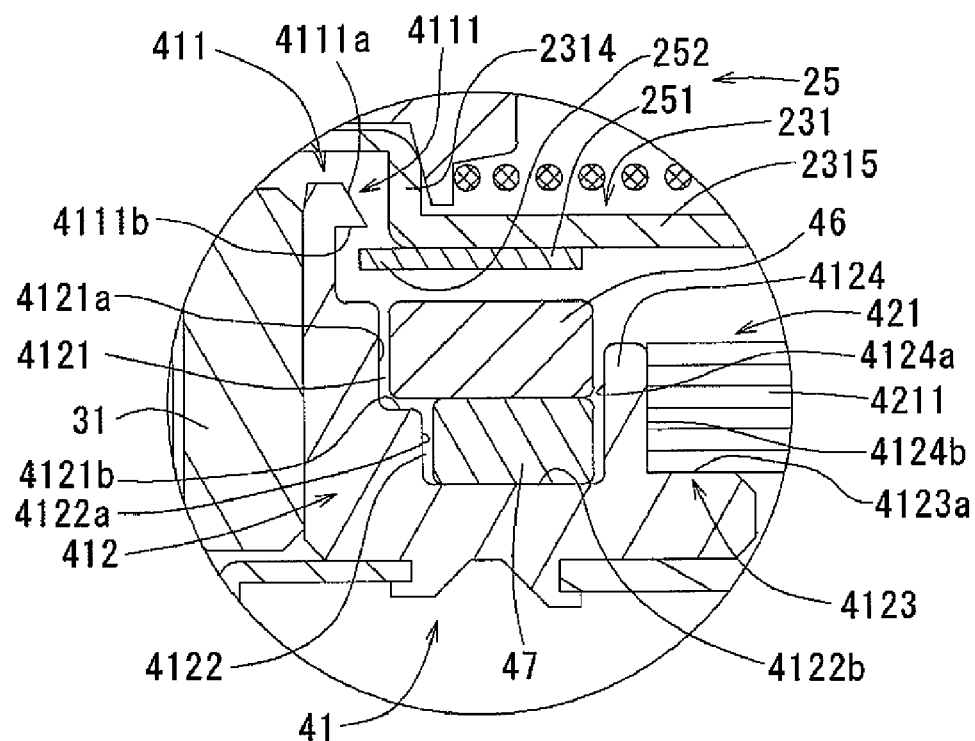
FIG. 5 is an enlarged view illustrating an attracting magnet and its neighboring structure in the motor shown in FIG. 1.
Figure 6:
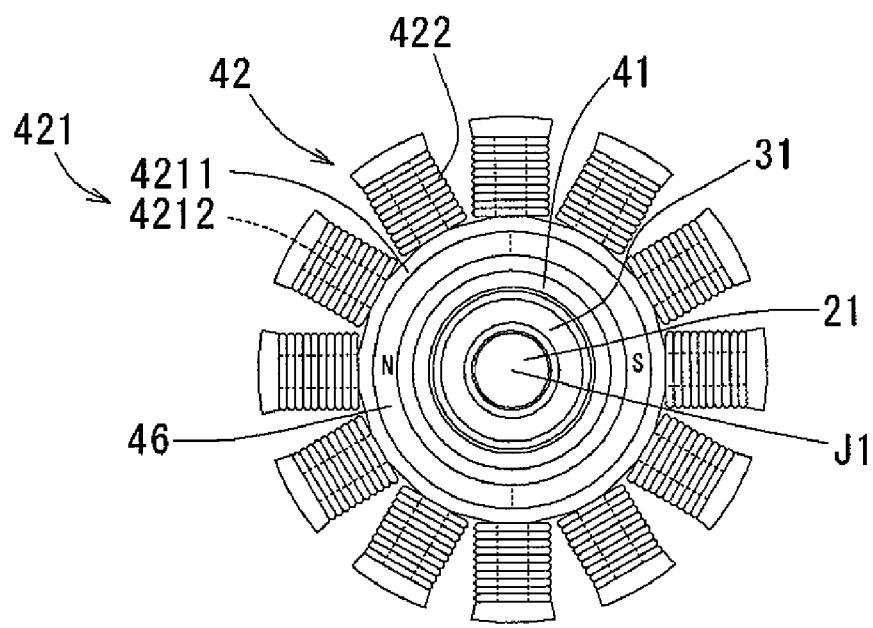
FIG. 6 is a top plan view of a fixed body, illustrating the attracting magnet and its neighboring structure.

Next, the attracting magnet 46 and its neighboring structure will be described with reference to FIGS. 5 and 6. FIG. 5 is an enlarged view of the attracting magnet 46 and its neighboring structure shown in FIG. 1. FIG. 6 is a top plan view of the attracting magnet 46 and its neighboring structure, with the circuit board 44 and the attachment plate 43 omitted from illustration. Furthermore, a method of magnetizing the attracting magnet 46 will be described with reference to FIG. 7, which is a schematic diagram showing a structure for magnetization of the attracting magnet 46.

Referring to FIG. 5, the housing 41 is preferably formed by cutting a non-magnetic brass material. The housing 41 preferably has a substantially cylindrical shape and has a through-hole whose inner circumferential surface makes contact with the outer circumferential surface of the sleeve 31. In addition, the housing 41 includes a cylindrical holding portion 411 facing toward the upper outer circumferential surface of the sleeve 31 and a base portion 412 extending radially outwardly from the lower extension of the cylindrical holding portion 411.

In the upper portion of the cylindrical holding portion 411, there is preferably provided a substantially cylindrical protrusion 4111 that extends radially outwardly. The protrusion 4111 preferably has an annular slanting surface 4111a inclined radially outwardly and axially downwardly. The protrusion 4111 is preferably further provided with a lower planar surface 4111b perpendicular to the center axis J1. The planar surface 4111b preferably has an annular shape.

When the rotating body 2 is attached to the fixed body 4, the removal preventing projections 252 of the below-mentioned removal preventing member 25 are axially downwardly moved while bearing against the slanting surface 4111a. This makes it possible to prevent an increased force from being applied to the turntable 231 when the rotating body 2 is attached to the fixed body 4. If the rotating body 2 is urged to move axially upwardly, the removal preventing projections 252 come into contact with the planar surface 4111b of the protrusion 4111. Consequently, the rotating body 2 is kept from moving axially upwardly.

Over the base portion 412 are formed a first hollow portion 4121 downwardly depressed from the upper surface of the base portion 412 and a second hollow portion 4122 formed below and joined to the first hollow portion 4121. A stator mounting portion 4123 to which the stator 42 is mounted is preferably provided in the base portion 411 radially outwardly of the first hollow portion 4121 and the second hollow portion 4122.

Each of the first hollow portion 4121 and the second hollow portion 4122 preferably has an annular shape. The second hollow portion 4122 preferably has a radial width smaller than that of the first hollow portion 4121. The radially outward inner circumferential surface of the first hollow portion 4121 and the radially outward inner circumferential surface of the second hollow portion 4122 are preferably formed on a single axially-extending surface.

A portion of radially inward outer circumferential surface (hereinafter referred to as a first outer circumferential surface 4121a) of the base portion 412 adjacent to the first hollow portion 4121 is formed radially inwardly of a portion of radially inward outer circumferential surface (hereinafter referred to as a second outer circumferential surface 4122a) of the base portion 412 adjacent to the second hollow portion 4122.

The first outer circumferential surface 4121a preferably joins to the second outer circumferential surface 4122a via a substantially annular planar surface (hereinafter referred to as a first bottom surface 4121b) of the base portion 412 adjacent to a lower boundary of the first hollow portion 4121. A surface of the base portion 412 adjacent to the lower boundary of the second hollow portion 4122 is preferably a substantially annular planar surface (hereinafter referred to as a second bottom surface 4122b) extending perpendicularly to the center axis J1.

The housing 41 is preferably provided with an outer cylinder portion 4124 as a peripheral wall portion. The outer cylinder portion 4124 preferably has an inner circumferential surface 4124a of the base portion 412 that is adjacent to the first and second hollow portion 4121 and 4122, and an outer circumferential surface 4124b that radially faces toward the stator 42 mounted to the stator mounting portion 4123.

Referring to FIG. 6, the stator 42 preferably includes a stator core 421 formed by axially laminating a plurality of electromagnetic steel plates and a plurality of coils 422 formed by repeatedly winding a conductive wire around the stator core 421.

The stator core 421 preferably includes a substantially annular core back portion 4211 whose center is concentric with the center axis J1 and a plurality of circumferentially spaced-apart tooth portions 4212 extending radially outwardly from the core back portion 4211. In the present preferred embodiment, the tooth portions 4212 preferably are twelve in number, for example. The plurality of coils 422 is formed by concentratedly winding a conductive wire around the tooth portions 4212. In the present preferred embodiment, the coils 422 preferably are twelve in number, for example. However, any desired number of coils or teeth could be used.

Referring back to FIG. 5, the stator mounting portion 4123 of the housing 41 preferably includes an extension portion 4123a having an upper surface kept in contact with the lower surface of the core back portion 4211 of the stator core 421 and an outer cylinder portion 4124 having an outer circumferential surface 4124b that radially faces toward the inner circumferential surface of the core back portion 4211. The stator core 421 is affixed to the stator mounting portion 4123 of the housing 41 preferably via an adhesive agent.

A substantially annular yoke 47 as a magnetic body is arranged in the second hollow portion 4122 of the housing 41. The yoke 47 is preferably fixed to the second bottom surface 4122b by an adhesive agent. In this regard, the inner and outer circumferential surfaces of the yoke 47 may be fixed to the second hollow portion 4122 by filling an adhesive agent into the second hollow portion 4122. In this case, it is possible to firmly fix the yoke 47 to the housing 41.

The upper surface of the yoke 47 is preferably positioned axially upwardly of the first bottom surface 4121b. The attracting magnet 46 is arranged on the upper surface of the yoke 47. The upper surface of the yoke 47 and the lower surface of the attracting magnet 46 are kept in contact with each other. The attracting magnet 46 and the yoke 47 are arranged radially inwardly of the inner circumferential surface of the core back portion 4211 of the stator 42. In this connection, the attracting magnet 46 is magnetized with two poles along the circumferential direction thereof (see FIG. 6). Inasmuch as the second hollow portion 4122 is combined with the first hollow portion 4121, it is possible to make the motor thin even if the yoke 47 is arranged axially below the attracting magnet 46.

Referring to FIG. 5, the lower surface of the attracting magnet 46 is preferably arranged axially below the upper surface of the core back portion 4211 of the stator core 421. This eliminates the need to arrange the attracting magnet 46 in a limited axial space between the upper surface of the stator core 421 and the lower surface of the second planar portion 2315 of the turntable 231. As a consequence, it becomes possible to minimize the axial distance between the second planar portion 2315 of the turntable 231 and the stator 42, which assists in making the motor thin. In an instance that an attracting magnet would be arranged on the upper surface of the stator core 421, the attracting magnet is restricted in its axial thickness. In order to make the motor thin, the axial thickness of the attracting magnet needs to be set smaller than the axial height of the coils 422 measured from the stator core 421.

In the present preferred embodiment, it is possible to alleviate the restriction imposed on the axial thickness of the attracting magnet 46, because the attracting magnet 46 is arranged radially inwardly of the inner circumferential surface of the core back portion 4211 of the stator core 421 and because the lower surface of the attracting magnet 46 is arranged axially below the upper surface of the core back portion 4211. This arrangement makes it possible to set the volume of the attracting magnet 46 with a considerable degree of freedom. As a result, it becomes possible to change the force at which the turntable 231 is axially downwardly attracted by the attracting magnet 46. Therefore, it is possible to provide a plurality of types of motors that remain substantially identical in their structures other than the attracting magnet 46 but differ in their forces for axially downwardly attracting the turntable 231.

Figure 7:
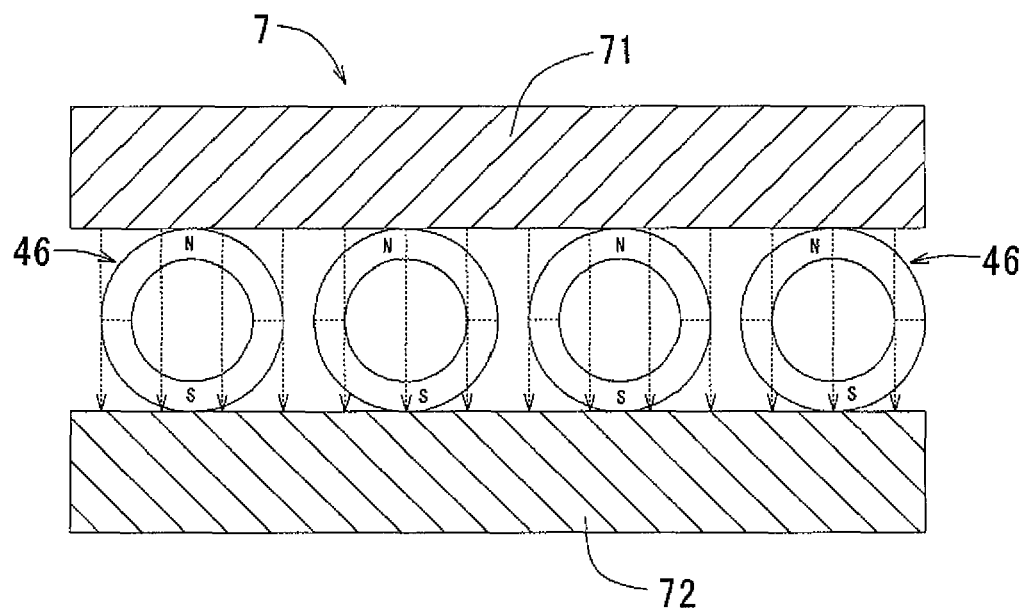
FIG. 7 is a schematic diagram for explaining magnetization of the attracting magnet in accordance with a preferred embodiment of the present invention.

Referring to FIG. 7, a plurality of the attracting magnets 46 are retained by a magnetizing jig 7 in such a fashion that the outer circumferential surface of each of the attracting magnets 46 makes contact with the magnetizing jig 7 at two points. Then, the attracting magnets 46 are magnetized simultaneously. In FIG. 7, the direction of magnetic fields generated by the magnetizing jig 7 is indicated by dot line arrows.

Since the attracting magnet 46 employed in the present preferred embodiment is magnetized to have two poles, it is possible to use a magnetizing jig in which the attracting magnet 46 can be arranged in plural numbers as is the case in the magnetizing jig 7. In the event that an attracting magnet would be magnetized to have four poles, it is impossible to use the magnetizing jig 7 depicted in FIG. 7. Therefore, it would be necessary to use a magnetizing jig that can surround the attracting magnet, with the outer circumferential surface of the attracting magnet divided into four regions. In this case, only a single attracting magnet can be magnetized by the magnetizing jig, which means that the process for magnetizing the attracting magnet suffers from reduction in efficiency. This makes it impossible to increase the productivity of the motor.

The attracting magnet 46 employed in the present preferred embodiment has two poles as distinguished from the attracting magnet magnetized with four poles. For that reason, the magnetizing jig 7 is formed of a first jig 71 and a second jig 72 surrounding the bisected regions of the outer circumferential surface of the attracting magnet 46. Therefore, even when the attracting magnets 46 are arranged in plural numbers as illustrated in FIG. 7, it is possible to simultaneously magnetize all of the attracting magnets 46 by arranging the first jig 71 and the second jig 72 in parallel. As a result, the process for magnetizing the attracting magnets can enjoy increased efficiency, which leads to an increase in the motor production efficiency.

Referring again to FIG. 5, the radial position of the outer circumferential surface of the yoke 47 is substantially the same as that of the outer circumferential surface of the attracting magnet 46. This preferably ensures that the magnetic flux of the attracting magnet 46 flows toward the yoke 47. Therefore, the magnetic flux is surely prevented from flowing toward the stator core 421 of the stator 42. This eliminates the possibility that the magnetic circuit formed between the stator 42 and the rotor magnet 22 is affected by the magnetic flux of the attracting magnet 46. As a result, it is possible to increase the force at which the turntable 231 is attracted axially downwardly by the attracting magnet 46.

Referring again to FIG. 5, the upper surface of the outer cylinder portion 4124 and the upper surface of the core back portion 4211 of the stator core 421 are arranged substantially evenly in an axial direction. The inner circumferential surface of the outer cylinder portion 4124 radially faces toward the outer circumferential surface of the attracting magnet 46 over about one half of the axial length of the latter. In other words, the first bottom surface 4121b is formed axially below the upper surface of the outer cylinder portion 4124.

Thanks to this feature, the inner circumferential surface of the outer cylinder portion 4124 can prevent radial movement of the attracting magnet 46 even when the motor itself is suddenly moved in a radial direction by an external shock or the like. In addition, it is possible to arrange the lower surface of the attracting magnet 46 axially below the upper surface of the core back portion 4211 of the stator core 421. This assists in making the motor thin.

Most of the inner circumferential surface of the core back portion 4211 of the stator core 421 can be used as a bonding area over which the outer circumferential surface 4124b of the outer cylinder portion 4124 is bonded to the inner circumferential surface of the core back portion 4211. This makes it possible to firmly affix the stator 42 to the stator mounting portion 4123. Therefore, it is possible for the housing 41 to reliably hold the stator 42 even when the motor itself is suddenly moved by an external shock or the like.

A tiny axial gap is formed between the first bottom surface 4121b on the base portion 412 of the housing 41 and the lower surface region of attracting magnet 46 lying radially inwardly of the yoke 47. This makes it possible to prevent the upper surface of the attracting magnet 46 from being tilted out of perpendicularity with respect to the center axis J1, which might otherwise occur when the attracting magnet 46 makes contact with the first bottom surface 4121b. Therefore, it is possible to ensure that the axial distance between the upper surface of the attracting magnet 46 and the lower surface of the second planar portion 2315 of the turntable 231 is kept constant in radial and circumferential directions. As a consequence, it becomes possible to suppress the possibility that the force at which the turntable 231 is attracted by the attracting magnet 46 is changed during rotation of the turntable 231.

Radial gaps are preferably provided respectively between the second outer circumferential surface 4122a of the base portion 412 of the housing 41 and the inner circumferential surface of the yoke 47 and between the inner circumferential surface 4124a of the outer cylinder portion 4124 radially facing toward the yoke 47 and the outer circumferential surface of the yoke 47.

Likewise, radial gaps are preferably provided respectively between the first outer circumferential surface 4121a of the base portion 412 and the inner circumferential surface of the attracting magnet 46 and between the inner circumferential surface 4124a of the outer cylinder portion 4124 radially facing toward the attracting magnet 46 and the outer circumferential surface of the attracting magnet 46. These structures make it possible to accurately arrange the yoke 47 and the attracting magnet 46 regardless of the machining accuracy of first outer circumferential surface 4121a, the second outer circumferential surface 4122a and the inner circumferential surface 4124a of the outer cylinder portion 4124. Therefore, it is possible to arrange the yoke 47 and the attracting magnet 46 with increased accuracy.

The upper surface of the attracting magnet 46 axially faces toward the lower surface of the second planar portion 2315 of the turntable 231. The attracting magnet 46 serves to magnetically attract the second planar portion 2315 in an axially downward direction. The removal preventing member 25 that restrains the rotating body 2 from moving axially upwardly is welded to the radial inner region of the lower surface of the second planar portion 2315 axially facing toward the upper surface of the attracting magnet 46. Since the removal preventing member 25 is arranged in such a position as to axially face toward the attracting magnet 46, it becomes easy to secure a space for attaching the removal preventing member 25.

The removal preventing member 25 preferably is formed into a substantially annular shape by pressing a thin metal plate. The removal preventing member 25 includes a substantially annular base portion 251 fixed to the inner edge region of the second planar portion 2315, a plurality of circumferentially spaced-apart removal preventing projections 252 integrally formed with the base portion 251 and extending radially inwardly from the base portion 251. In the present preferred embodiment, the removal preventing projections 252 preferably are three in number, for example, but any desirable number could be used. The removal preventing projections 252 protrude radially inwardly from the inner circumferential surface of the second cylinder portion 2314. Furthermore, the removal preventing projections 252 are radially inwardly projected beyond the outer edge of the protrusion 4111 of the housing 41.

The inner diameter of the inner circumferential surface of the attracting magnet 46 is substantially the same as that of the inner circumferential surface of the second cylinder portion 2314. This makes it possible for the attracting magnet 46 to attract the inner edge region of the second planar portion 2315. The first outer circumferential surface 4121a of the housing 41 is formed radially outwardly of the outer circumferential surface of cylindrical holding portion 411. Therefore, it is possible for the housing 41 to reliably hold the sleeve 31.

Disk Driving Device

Figure 8:
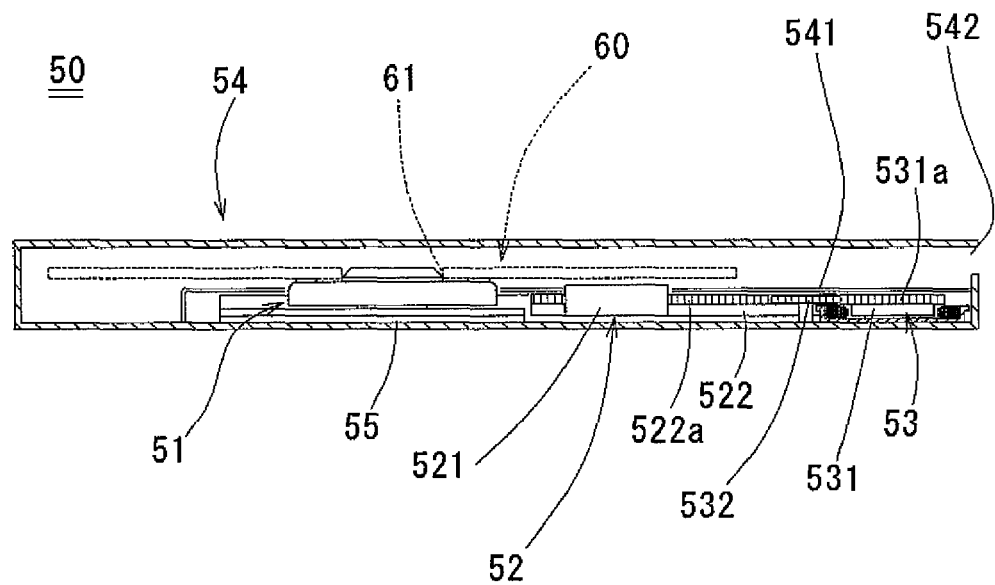
FIG. 8 is an axially-cut schematic section view showing a preferred embodiment of a disk driving device in accordance with the present invention.

One preferred embodiment of a disk driving device in accordance with the present invention will now be described with reference to FIG. 8. FIG. 8 is an axially-cut schematic section view showing the present disk driving device.

Referring to FIG. 8, the disk driving device 50 includes a spindle motor 51 arranged to rotate a disk 60 having a central opening portion 61, the spindle motor 51 designed to bring itself into coaxial alignment with the rotational axis of the disk 60 as it is inserted into the central opening portion 61 of the disk 60, an optical pickup mechanism 52 arranged to irradiate light on the disk 60 and receive the light reflected from the disk 60, a gear mechanism 53 serving as a moving mechanism and arranged to move the optical pickup mechanism 52 in a turning radius direction of the disk 60, and a housing 54 arranged to receive the spindle motor 51, the optical pickup mechanism 52 and the gear mechanism 53.

The spindle motor 51 and the optical pickup mechanism 52 are held in place via a chassis 55. As the chassis 55 is moved at least in an axial direction, the central opening portion 61 of the disk 60 is mounted to the chucking device of the spindle motor 51. The chassis 55 is provided with an aperture and the optical pickup mechanism 52 is arranged inside the aperture.

The gear mechanism 53 includes a motor 531 with a driving gear 531a on its output shaft and a counter gear 532 for transferring the torque of the motor 531.

A thin partition plate 541 for spatially isolating the disk 60 and the gear mechanism 53 is formed in the housing 54. Furthermore, a gate hole 542 through which the disk 60 is inserted and taken out is formed in the housing 54.

The optical pickup mechanism 52 includes a light emitting and receiving unit 521 arranged to irradiate, e.g., a laser beam, on the disk 60 and receive the laser beam reflected from the disk 60, and a carriage unit 522 arranged to carry the light emitting and receiving unit 521, the carriage unit 522 arranged substantially perpendicularly to the radial moving direction of the disk 60. The carriage unit 522 has a rack portion 522a that comes into meshing engagement with the counter gear 532. The light emitting and receiving unit 521 is adapted to move in the radial direction together with the carriage unit 522.

As the driving gear 531a attached to the motor 531 rotates in meshing engagement with the counter gear 532, the carriage unit 522 having the rack portion 522a meshed with the counter gear 532 is moved in the radial direction. Such movement of the carriage unit 522 causes the light emitting and receiving unit 521 to move in the radial direction.

By applying the present motor 1 to the spindle motor 51 of the disk driving device 50, it becomes possible to accurately arrange the lower surface of the disk 60 with respect to the direction in which the light is irradiated by the optical pickup mechanism 52. Therefore, it is possible to provide a disk driving device capable of recording and reproducing the disk 60 with increased accuracy.

As a consequence, it is possible to provide a highly reliable disk driving device free from recording and reproducing errors when the disk 60 is mounted to the spindle motor 51. Moreover, it is possible to make the disk driving device 50 thin and also to reduce the vibration applied to the disk support portion 2311. This makes it possible to provide a highly reliable disk driving device.

While preferred embodiments of the present invention have been described hereinabove, the present invention is not limited thereto. Many changes or modifications may be made without departing from the scope of the claims.

Although the shaft 21 and the turntable 231 preferably are directly fixed to each other in the foregoing preferred embodiment, the present invention is not limited thereto. As an alternative example, a substantially annular bush may be interposed between the shaft 21 and the turntable 231. The bush is preferably made of, e.g., a metallic material. It is preferred that the bush is fixed to the shaft 21 and is bonded to the turntable 231 by an adhesive agent.

Although the yoke 47 is preferably arranged below the attracting magnet 46 in the foregoing preferred embodiment, the present invention is not limited thereto. As an alternative example, the attracting magnet 46 may be directly fixed to the housing 41. In this case, there is no need to form the second hollow portion 4122. However, it is preferred that the yoke 47 is arranged below the attracting magnet 46 with a view to avoid leakage of the magnetic flux of the attracting magnet 46 to the stator core 421. In case where only the attracting magnet 46 is fixed to the housing 41, it is preferred that the attracting magnet 46 is magnetized with four or more poles along the circumferential direction thereof in order to avoid leakage of the magnetic flux to the stator core 421.

Although the sleeve 31 preferably is used as the bearing mechanism 3 in the foregoing preferred embodiment, the present invention is not limited thereto. As an alternative example, a ball bearing may be used in place of the sleeve 31.

Although the turntable 231 preferably includes the first cylinder portion 2312, the first planar portion 2313, the second cylinder portion 2314, the second planar portion 2315 and the third cylinder portion 2316 in the foregoing preferred embodiment, the present invention is not limited thereto. Since it is sufficient if the turntable 231 is provided with the central recess portion 2317, the first planar portion 2313 may not be formed in the turntable 231. In this case, the second cylinder portion 2314 is formed into a substantially cylindrical shape with its diameter growing smaller in an axially upward direction. In this case, the first cylinder portion 2312 joins to the second cylinder portion 2314 via the curved portion existing therebetween.

Although the chuck case 232 preferably includes the casing 2321, the resilient members 2322 and the chuck claws 2323 in the foregoing preferred embodiments, the present invention is not limited thereto. As an alternative example, the chuck case may include only the centering claws 2321a1 designed to bring the center of the disk into alignment with the center of the chuck case 232. In this case, it would be necessary to employ an additional mechanism for holding the disk in the disk support portion 2311 of the motor 1.

Although the resilient members 2322 of the chuck case preferably are coil springs in the foregoing preferred embodiment, the present invention is not limited thereto. As an alternative example, the resilient members 2322 may be formed of elastic resin materials or leaf springs.

Although the rotor magnet 22 preferably is attached to the third cylinder portion 2316 of the turntable 231 and the disk support portion 2311 is provided in the second planar portion 2315 in the foregoing preferred embodiment, the present invention is not limited thereto. As an alternative example, the turntable 231 may be formed of two members, i.e., a member for holding the rotor magnet 22 and a member provided with a disk support portion. In this case, the member provided with the disk support portion is arranged axially above the member for holding the rotor magnet 22.

Although the yoke 47 and the attracting magnet 46 preferably have an annular shape in the foregoing preferred embodiment, the present invention is not limited thereto. Alternatively, the yoke 47 and the attracting magnet 46 may have an arc shape.

While the present invention has been shown and described with respect to the preferred embodiments, it will be understood by those skilled in the art that various changes and modifications may be made without departing from the scope of the present invention as defined in the following claims.

What is claimed is:

1. A motor comprising:
    a rotating body including a rotor magnet rotatable about a rotational axis and a rotor holder that holds the rotor magnet; and
    a fixed body including a stator arranged to oppose the rotor magnet; wherein
    the stator includes:
        a stator core having an annular core back portion, and a plurality of circumferentially spaced-apart tooth portions extending from the core back portion in a direction away from the rotational axis; and
        a plurality of coils provided by winding a conductive wire around the tooth portions of the stator core with multiple turns;
    the rotor holder is arranged axially above the stator to cover the stator; and
    an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein
    a magnetic yoke is arranged on the lower surface of the attracting magnet; and
    the yoke has an annular or arc shape, and has a radial width smaller than that of the attracting magnet.

2. The motor of claim 1, wherein the attracting magnet has an outer circumferential surface that is substantially flush with an outer circumferential surface of the yoke in an axial direction.

3. A motor comprising:
    a rotating body including a rotor magnet rotatable about a rotational axis and a rotor holder that holds the rotor magnet; and
    a fixed body including a stator arranged to oppose the rotor magnet; wherein
    the stator includes:
        a stator core having an annular core back portion, and a plurality of circumferentially spaced-apart tooth portions extending from the core back portion in a direction away from the rotational axis; and
        a plurality of coils provided by winding a conductive wire around the tooth portions of the stator core with multiple turns;
    the rotor holder is arranged axially above the stator to cover the stator; and
    an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein
    a magnetic yoke is arranged on the lower surface of the attracting magnet; and
    the yoke has an annular or arc shape, and the attracting magnet has an outer circumferential surface that is substantially flush with an outer circumferential surface of the yoke in an axial direction.

4. The motor of claim 3, wherein the attracting magnet is magnetized with two poles along a circumferential direction thereof.

5. The motor of claim 3, wherein the yoke has an annular or arc shape, and has a radial width smaller than that of the attracting magnet.

6. The motor of claim 3, wherein
the fixed body includes a substantially cylindrical bearing mechanism arranged to rotatably support the rotating body, and a housing having a cylindrical holding portion arranged to hold the bearing mechanism;
the housing has an annular extension portion extending radially outwardly from the cylindrical holding portion;
the extension portion includes a mounting portion to which the lower surface of the core back portion of the stator core is mounted, and a peripheral wall portion to which the core back portion is fixed at its inner circumferential surface; and
a hollow portion in which the attracting magnet is accommodated is arranged radially inwardly of the peripheral wall portion, the hollow portion having a lower surface formed axially below an upper surface of the peripheral wall portion.

7. The motor of claim 6, wherein
the rotor holder includes a central recess portion depressed in an axially upward direction arranged to receive a portion of the cylindrical holding portion of the housing, and a planar portion extending radially outwardly from the central recess portion;
a radially outwardly extending protrusion is provided in an upper extension of the cylindrical holding portion;
a removal preventing member having a plurality of removal preventing portions spaced apart circumferentially with each other and protruding radially inwardly from an inner edge of the planar portion is attached to a radially inner region of the planar portion;
each of the removal preventing portions has an upper surface that, when the rotating body is lifted in an axially upward direction, makes contact with a lower surface of the protrusion to restrain further axial upward movement of the rotating body; and
the attracting magnet is arranged in an approximately same radial position as that of the removal preventing member.

8. The motor of claim 3, wherein
the fixed body includes a substantially cylindrical bearing mechanism arranged to rotatably support the rotating body, and a housing having a cylindrical holding portion arranged to hold the bearing mechanism;
the housing has an annular extension portion extending radially outwardly from the cylindrical holding portion;
the extension portion includes a mounting portion to which the lower surface of the core back portion of the stator core is mounted, and a peripheral wall portion to which the core back portion is fixed at its inner circumferential surface;
a first hollow portion in which the attracting magnet is placed and a second hollow portion in which the yoke is placed are arranged radially inwardly of the peripheral wall portion; and
the second hollow portion has a lower surface arranged axially below the first hollow portion, the first hollow portion has a lower surface arranged axially below an upper surface of the peripheral wall portion, and the first hollow portion joins to the second hollow portion.

9. The motor of claim 8, wherein an adhesive agent is applied at least on the lower surface of the second hollow portion.

10. The motor of claim 8, wherein gaps are formed between the inner circumferential surface, the outer circumferential surface, and the lower surface of the attracting magnet and the first hollow portion.

11. The motor of claim 3, wherein
the rotor holder is provided with a disk support portion arranged to support a disk;
a chucking device arranged to hold the disk is mounted to the rotor holder radially inwardly of the disk support portion; and
the chucking device includes a chuck claw arranged to hold the disk and a resilient member to bias the chuck claw in a radially outward direction.

12. A disk driving device equipped with the motor of claim 3, further comprising:
an optical pickup mechanism arranged to irradiate light on a disk and receive the light after it is reflected from the disk; and
a moving mechanism arranged to move the optical pickup mechanism in a radial direction with respect to the disk.

13. A motor comprising:
a rotating body including a rotor magnet rotatable about a rotational axis and a rotor holder that holds the rotor magnet; and
a fixed body including a stator arranged to oppose the rotor magnet; wherein
the stator includes:
a stator core having an annular core back portion, and a plurality of circumferentially spaced-apart tooth portions extending from the core back portion in a direction away from the rotational axis; and
a plurality of coils provided by winding a conductive wire around the tooth portions of the stator core with multiple turns;
the rotor holder is arranged axially above the stator to cover the stator; and
an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein
the fixed body includes a substantially cylindrical bearing mechanism arranged to rotatably support the rotating body, and a housing having a cylindrical holding portion arranged to hold the bearing mechanism;
the housing has an annular extension portion extending radially outwardly from the cylindrical holding portion;
the extension portion includes a mounting portion to which the lower surface of the core back portion of the stator core is mounted, and a peripheral wall portion to which the core back portion is fixed at its inner circumferential surface; and
a hollow portion in which the attracting magnet is accommodated is arranged radially inwardly of the peripheral wall portion, the hollow portion having a lower surface formed axially below an upper surface of the peripheral wall portion.

14. A motor comprising:
a rotating body including a rotor magnet rotatable about a rotational axis and a rotor holder that holds the rotor magnet; and a fixed body including a stator arranged to oppose the rotor magnet; wherein the stator includes:
- a stator core having an annular core back portion, and a plurality of circumferentially spaced-apart tooth portions extending from the core back portion in a direction away from the rotational axis; and
- a plurality of coils provided by winding a conductive wire around the tooth portions of the stator core with multiple turns;

the rotor holder is arranged axially above the stator to cover the stator; and an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein a magnetic yoke is arranged on the lower surface of the attracting magnet;

the fixed body includes a substantially cylindrical bearing mechanism arranged to rotatably support the rotating body, and a housing having a cylindrical holding portion arranged to hold the bearing mechanism;

the housing has an annular extension portion extending radially outwardly from the cylindrical holding portion;

the extension portion includes a mounting portion to which the lower surface of the core back portion of the stator core is mounted, and a peripheral wall portion to which the core back portion is fixed at its inner circumferential surface;

a first hollow portion in which the attracting magnet is placed and a second hollow portion in which the yoke is placed are formed radially inwardly of the peripheral wall portion; and the second hollow portion has a lower surface arranged axially below the first hollow portion, the first hollow portion has a lower surface formed axially below an upper surface of the peripheral wall portion, and the first hollow portion joins to the second hollow portion.

15. A motor comprising:

a rotating body including a rotor magnet rotatable about a rotational axis and a rotor holder that holds the rotor magnet; and a fixed body including a stator arranged to oppose the rotor magnet; wherein the stator includes:
- a stator core having an annular core back portion, and a plurality of circumferentially spaced-apart tooth portions extending from the core back portion in a direction away from the rotational axis; and
- a plurality of coils provided by winding a conductive wire around the tooth portions of the stator core with multiple turns;

the rotor holder is arranged axially above the stator to cover the stator; and an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein a magnetic yoke is arranged on the lower surface of the attracting magnet;

the fixed body includes a substantially cylindrical bearing mechanism arranged to rotatably support the rotating body, and a housing having a cylindrical holding portion arranged to hold the bearing mechanism;

the housing has an annular extension portion extending radially outwardly from the cylindrical holding portion;

the extension portion includes a mounting portion to which the lower surface of the core back portion of the stator core is mounted, and a peripheral wall portion to which the core back portion is fixed at its inner circumferential surface;

a first hollow portion in which the attracting magnet is placed and a second hollow portion in which the yoke is placed are formed radially inwardly of the peripheral wall portion;

the second hollow portion has a lower surface arranged axially below the first hollow portion, the first hollow portion has a lower surface formed axially below an upper surface of the peripheral wall portion, and the first hollow portion joins to the second hollow portion; and an adhesive agent is applied at least on the lower surface of the second hollow portion.

16. A motor comprising:

a rotating body including a rotor magnet rotatable about a rotational axis and a rotor holder that holds the rotor magnet; and a fixed body including a stator arranged to oppose the rotor magnet; wherein the stator includes:
- a stator core having an annular core back portion, and a plurality of circumferentially spaced-apart tooth portions extending from the core back portion in a direction away from the rotational axis; and
- a plurality of coils provided by winding a conductive wire around the tooth portions of the stator core with multiple turns;

the rotor holder is arranged axially above the stator to cover the stator; and an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein a magnetic yoke is arranged on the lower surface of the attracting magnet;

the fixed body includes a substantially cylindrical bearing mechanism arranged to rotatably support the rotating body, and a housing having a cylindrical holding portion arranged to hold the bearing mechanism;

the housing has an annular extension portion extending radially outwardly from the cylindrical holding portion;

the extension portion includes a mounting portion to which the lower surface of the core back portion of the stator core is mounted, and a peripheral wall portion to which the core back portion is fixed at its inner circumferential surface;

a first hollow portion in which the attracting magnet is placed and a second hollow portion in which the yoke is placed are formed radially inwardly of the peripheral wall portion; and the second hollow portion has a lower surface arranged axially below the first hollow portion, the first hollow portion has a lower surface formed axially below an upper surface of the peripheral wall portion, and the first hollow portion joins to the second hollow portion; and gaps are provided between the inner circumferential surface, the outer circumferential surface, and the lower surface of the attracting magnet and the first hollow portion.

17. A motor comprising:
a rotating body including a rotor magnet rotatable about a rotational axis and a rotor holder that holds the rotor magnet; and
a fixed body including a stator arranged to oppose the rotor magnet; wherein
the stator includes:
- a stator core having an annular core back portion, and a plurality of circumferentially spaced-apart tooth portions extending from the core back portion in a direction away from the rotational axis; and
- a plurality of coils provided by winding a conductive wire around the tooth portions of the stator core with multiple turns;

the rotor holder is arranged axially above the stator to cover the stator; and
an annular or arc-shaped attracting magnet arranged to attract the rotor holder toward the stator is arranged radially inwardly of the core back portion, the attracting magnet having an upper surface axially facing toward the rotor holder and a lower surface arranged axially below the upper surface of the core back portion of the stator core; wherein
the fixed body includes a substantially cylindrical bearing mechanism arranged to rotatably support the rotating body, and a housing having a cylindrical holding portion arranged to hold the bearing mechanism;
the housing has an annular extension portion extending radially outwardly from the cylindrical holding portion;
the extension portion includes a mounting portion to which the lower surface of the core back portion of the stator core is mounted, and a peripheral wall portion to which the core back portion is fixed at its inner circumferential surface;
a hollow portion in which the attracting magnet is accommodated is arranged radially inwardly of the peripheral wall portion, the hollow portion having a lower surface formed axially below an upper surface of the peripheral wall portion;
the rotor holder includes a central recess portion depressed in an axially upward direction arranged to receive a portion of the cylindrical holding portion of the housing, and a planar portion extending radially outwardly from the central recess portion;
a radially outwardly extending protrusion is arranged in an upper extension of the cylindrical holding portion;
a removal preventing member having a plurality of removal preventing portions spaced apart circumferentially with each other and protruding radially inwardly from an inner edge of the planar portion is attached to a radially inner region of the planar portion;
each of the removal preventing portions has an upper surface that, when the rotating body is lifted in an axially upward direction, makes contact with a lower surface of the protrusion to restrain further axial upward movement of the rotating body; and
the attracting magnet is arranged in an approximately same radial position as that of the removal preventing member.

* * * * *